INVENTORS
Danos H. Kallas
Saul A. Eller
Ernest Di Liberti
BY Ralph L. Chappell
ATTORNEY Patented Apr. 25, 1950

2,504,985

UNITED STATES PATENT OFFICE 2,504,985

HEAT-DISTORTION TESTING APPARATUS

Danos H. Kallas and Saul A. Eller, New York, N. Y., and Ernest Di Liberti, Secaucus, N. J.

Application April 28, 1945, Serial No. 590,855

6 Claims. (Cl. 73—15.4)

(Granted under the act of March 3, 1883, as amended April 30, 1928; 370 O. G. 757)

This invention relates to heat-distortion testing machines and more particularly to an apparatus for determining the heat-distortion temperature or softening point of a plastic or plastic impregnated material, namely, the maximum temperature to which such a material can be subjected in service.

An object of this invention is to provide an apparatus for determining the heat-distortion temperature or softening point of a material, wherein means is provided for minimizing errors due to thermal expansion within the apparatus itself.

A further object is to provide an apparatus affording a substantially frictionless load application to the specimen under test.

Another object is to protect the specimen supporting structure from the deleterious effects of intimate contact with the heated liquid or fumes of the bath.

A further object is to provide a compact, rigid and easily manufactured device capable of carrying out thermal distortion tests simply and accurately.

Figure 1:
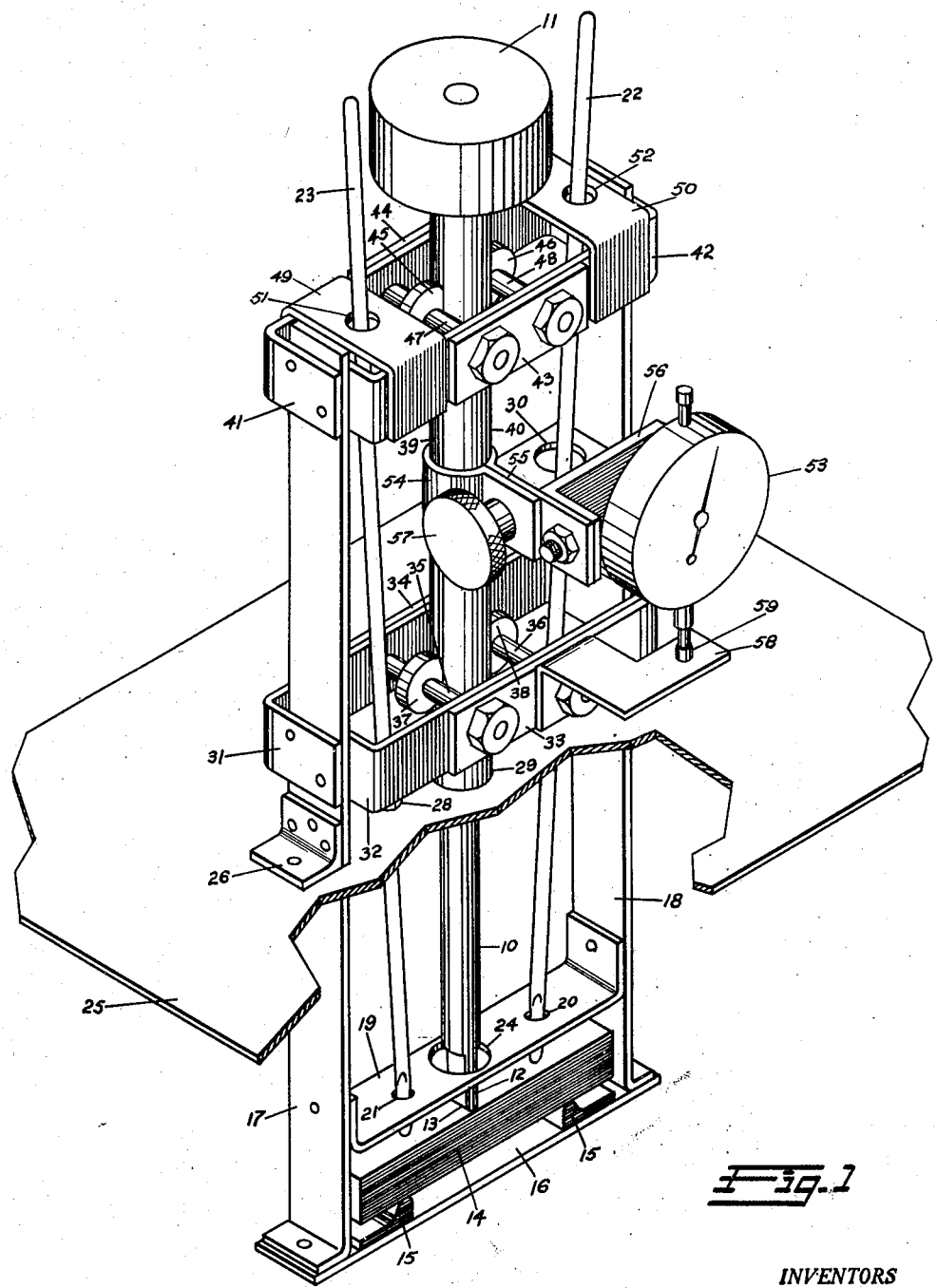
Figure 2:
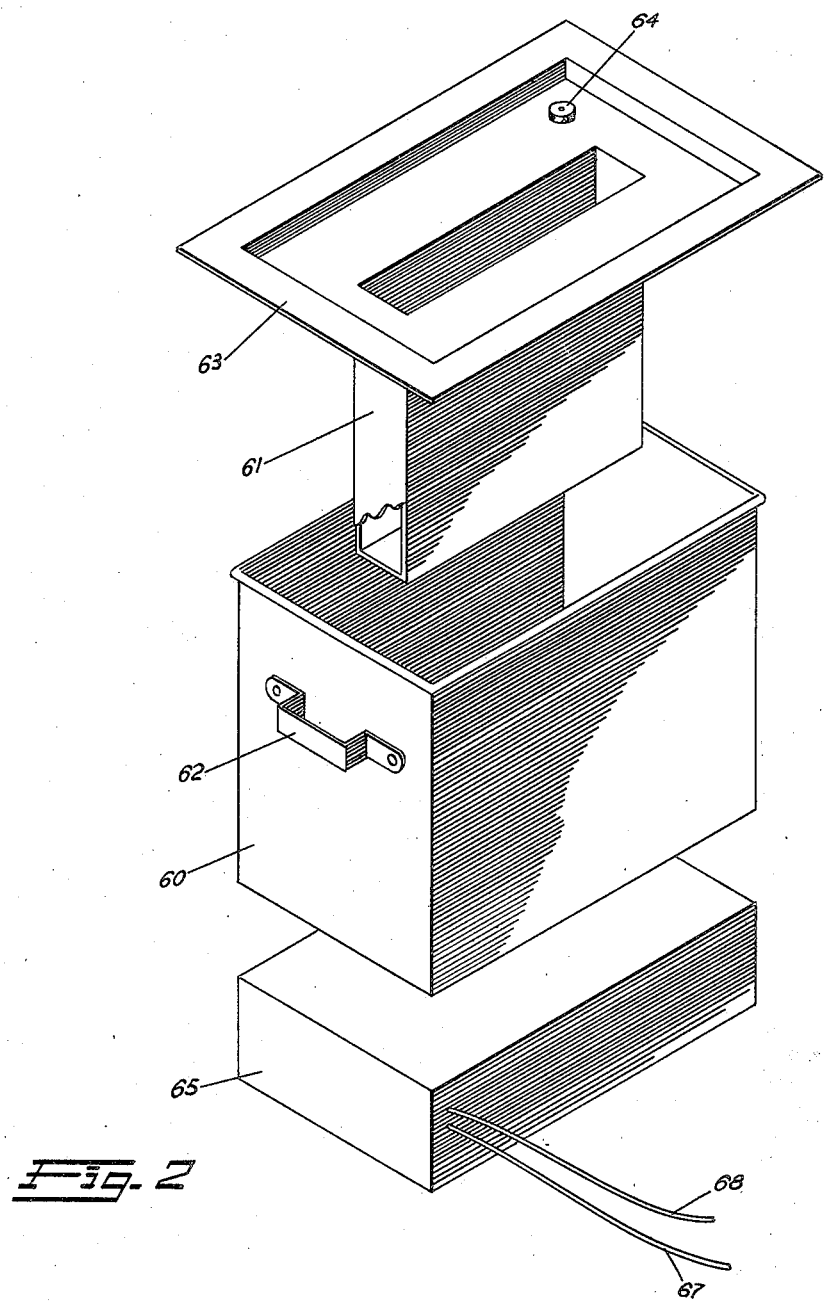

Further objects and advantages of this invention, as well as its construction, arrangement and operation, will be apparent from the following description and claims in connection with the accompanying drawings, in which, Fig. 1 is an isometric view of an embodiment of this invention, and Fig. 2 is an exploded view of the bath portions and heating element forming part of this invention.

In Fig. 1, there is shown a vertically disposed load shaft 10 having a reduced-diameter upper portion to receive a weight 11 and a finger-like lower portion 12, said finger-like portions 12 having a rounded edge 13 which will rest on a specimen 14 during the test. The test specimen 14 is placed on supports 15 of suitable material with a low coefficient of thermal expansion such as, for example, invar, said supports 15 being secured to a bottom plate 16. Side brackets 17 and 18 are riveted or otherwise fixedly secured to the bottom plate 16, said side brackets 17 and 18 extending vertically upwards and serving as the supporting members for a guide element 19 which is fixedly secured thereto. The guide element 19 has two bores 20 and 21 therein to guide the thermometers 22 and 23 to the test specimen 14 and a third bore 24 to permit the finger-like portion 12 to press upon the test specimen 14.

The side brackets 17 and 18 support the cover plate 25 which is fixedly secured to the said brackets 17 and 18 by the angle brackets 26 (one of which is obscured in the drawings) riveted or otherwise secured to the side brackets 17 and 18 and cover plate 25. The cover plate 25 contains two apertures 28 (one aperture being obscured by other structure) that serve as thermometer guides and a third larger aperture 29 in the center of the cover plate 25 to permit unimpaired vertical movement of the load shaft 10. A fourth opening 30 near a corner of the cover plate 25 permits the escape of fumes from the bath (to be described later) heating the specimen 14 during the test.

Above the cover plate 25, two substantially U-shaped braces 31 and 32 are riveted, bolted or otherwise secured to the brackets 17 and 18, said braces having bearing-shaft holders 33 and 34 fixedly secured thereto in any suitable manner. Bearing-shafts 35 and 36 supporting the bearings 37 and 38 are mounted on the braces 31 and 32 and bearing-shaft holders 33 and 34 through openings in said braces and said holders. The shafts 35 and 36 are held fixed to the supporting members 31, 32, 33 and 34 by bolts or other suitable means. The bearings 37 and 38 press against the parallel vertical channels 39 and 40 in the load shaft 10 forming a substantially frictionless support for said load shaft 10.

Braces 41 and 42, bearing-shaft holders 43 and 44, bearings 45 and 46, and bearing-shafts 47 and 48 similar to those already described are secured to the top of said brackets 17 and 18. Two crosspieces 49 and 50 having openings 51 and 52 therein are bolted or otherwise secured to the top braces 41 and 42 and serve as thermometer guides. The apertures and bores in the guide element 19, the cover plate 25 and crosspieces 49 and 50 lie substantially in straight lines so that the thermometers 22 and 23 can be inserted through the above recited elements, namely, guide elements 19, cover plate 25, and crosspieces 49 and 50 to rest above the test specimen 14.

A dial gauge 53 is attached to the load shaft 10 by means of a collar 54, clamping flanges 55 and arm 56. A thumbscrew 57 serves to release or increase the grip of the collar 54 about the load shaft 10. A rigid ledge 58 protrudes from the bearing-shaft holder 33, the plunger 59 of the dial gauge 53 resting on said ledge 58. The vertical motion of the load shaft 10 is transmitted to the dial gauge 53, but the plunger 59, restricted in its downward motion by the ledge 58, activates the dial gauge 53 which is graduated in thousandths of an inch of vertical motion.

The bath in which the specimen 14 is placed consists of an outer container 60 and an inner container 61 of suitable material such as, for example, copper, said outer container 60 having handles 62 (other not shown) attached thereto. The inner container 61 has a raised shelf or tray 63 which rests on the outer container 60 and serves as a seal for the air space between the outer and inner containers 60 and 61, respectively. The raised shelf 63 also supports the cover plate 25.

The space between the outer and inner containers 60 and 61, respectively, is partly filled with glycerine or other non-volatile fluid having a high flash-point. A vent 64 in the inner container 61 permits the escape of glycerine (or other suitable fluid) fumes that may arise when heat is applied to the outside container during the testing of the plastic or plastic impregnated specimen 14. Moreover, the specimen under test does not come in contact with any liquid or liquid fumes and is subjected to only dry heat.

The outer copper container 60, with the test assembly and inner container 61 in position, is placed on an electric heater 65 which is controlled by a standard voltage regulator (not shown), said voltage regulator serving to control the heating of the thermal conducting fluid between said inner and outer containers. The leads 67 and 68 are electrical conductors that carry the heating current from the varying voltage device not shown. The standard voltage regulator supplies sufficient heat to raise the air temperature surrounding the specimen at the desired rate, in accordance with the standards prescribed for the test.

In operation, the test specimen 14 is properly positioned onto the supports 15, and the load shaft 10 presses upon the specimen 14 through the finger-like element 12. The appropriate weight 11 is selected and secured to the top of said shaft 10. The collar 54 is adjusted so that the dial gauge 53 is set to zero when the plunger 59 of the dial gauge 53 contacts the ledge 58. The thumbscrew 57 is then turned to fixedly secure the collar 54 to the load shaft 10. Thermometers 22 and 23 are inserted into the specimen supporting framework through the guideways provided for them, the mercury bulbs of said thermometers 22 and 23 resting above but not contacting the specimen 14.

The specimen 14 is now ready for insertion into the bath. The bath parts are assembled, the inner tank 61 being placed into the outer tank 60, said outer tank 60 being partly filled with a non-volatile fluid having a high flash point. The assembled tanks are placed onto the heat supply stand 65.

The specimen supporting framework restricts any further downward motion of the specimen into the tank. The supporting stand for the specimen 14, when inserted into the bath, is completely housed by the inner tank 61 and is protected thereby from the harmful effects of the heated fluid or fumes of said heated fluid.

When all parts have been assembled as described above, controlled heat is applied to the bath by a conventional electric heater which is controlled by a conventional voltage regulator.

The ambient air temperature surrounding the specimen 14 at the time that the specimen 14 has distorted a predetermined amount is read off the two thermometers 22 and 23. If the temperature readings differ slightly, the mean of the two readings is taken.

Prior to performing the above described test, a standard specification for the test is submitted to the laboratory such as, for example, the following specification written by the American Society for Testing Materials: "The test specimen, 5 inches by 0.5 inch by 0.5 inch supported on a 4 inch span as a simple beam, is subjected to a dead weight load of 5.5 lbs. (2.5 kg.) applied at the midpoint of the span. The air temperature surrounding the test specimen is raised from 77±3.6° F. at the rate of approximately 1° F. per minute. When the deflection midway between supports is 0.010 inch during the temperature rise, the specimen is considered to have reached its heat distortion temperature. The apparatus required for this test has been standardized with a ⅛ inch radius for all specimen support and loading edges.

Many slight alterations can be made in this testing apparatus so that said apparatus could be used to make tests conforming to other rigorous specifications. For example, the rate of thermal heating could be other than 1° F. per minute; the size of test specimen 14 or weight 11 or amount of distortion could be altered. The radii of the specimen supports could be altered by making the supports 15 readily detachable from the base 16 and using in their stead other readily detachable invar supports having different radii of curvature.

This invention is useful not only in industrial or testing laboratories but also in physical science laboratories of schools and universities because it is simple to operate and maintain, rugged yet reliable, capable of making reasonably accurate measurements of heat distortion and can be manufactured in various sizes.

This invention readily lends itself to experimental tests because it enables reproducible results to be obtained under standard conditions, thereby permitting observations of reasonably accurate deflections versus reasonably accurate temperatures to be plotted on coordinate paper. The graphs thus obtained serve to show the thermal characteristic or characteristics of the specimen tested.

Various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. In a thermal distortion testing device, a framework for supporting a test specimen under distorting pressure, a bath consisting of an outer tank and a readily detachable inner tank insertable into said outer tank, an offset rim on the inner tank abutting the rim of the outer tank so as to limit the total entrance of said inner tank into said outer tank, the space between the walls of said tanks providing a space for containing liquid, said framework being received in said inner tank, specimen distortion measuring and specimen temperature measuring means secured to said framework, means mounted in said framework to apply a distorting force to the specimen, and a controlled heat distributing platform for supporting and indirectly transmitting heat to said framework inserted in said bath.

2. In a thermal distortion testing device, a framework for supporting a specimen under distorting pressure, a tray having an elevated and offset frame about its border, a walled tank depending from the central portion of said tray, a gas vent in a corner of said tray, a hollow housing partly filled with a thermal conducting fluid and having outside handles thereon, said depending wall tank and tray serving to house and support a portion of said specimen supporting framework, said walled tank being sufficiently smaller than said hollow housing to permit the insertion therein of said depending walled tank until said tray seals the chamber of said partially fluid-filled housing, said walled tank protecting the specimen and supporting framework from contact with the fumes or fluid of the thermal conducting means, and a regulated heating stand to support and transmit heat to said partially fluid-filled housing.

3. In a thermal distortion testing device, substantially U-shaped supporting framework, specimen supporting posts mounted on the base of said supporting framework, multiple horizontal braces secured in opposite pairs at spaced intervals along the vertical arms of said U-shaped supporting structure, bearing shafts secured in opposite pairs at right angles to said horizontal braces, circular bearings mounted on said shafts, a vertically disposed cylindrical rod having two longitudinal, parallel, and diametrically disposed channels machined therein for substantially frictionless slidable engagement with said circular bearings mounted on said bearing shafts, readily detachable weight means mounted on the head of said rod, a fingerlike element protruding from the foot of said rod to rest upon the specimen being supported on said specimen supporting posts, a cover lid secured to the substantially U-shaped supporting framework, an inner tank, and outer tank, said inner tank receiving said framework, said outer tank adapted to contain a liquid, said cover lid restricting the motion of said supporting framework when said specimen supporting framework is inserted in said inner tank, and a dial gauge secured to and registering the motion of said cylindrical rod.

4. The invention as set forth in claim 3 and a controlled heat distributing platform for supporting and transmitting heat to said outer tank.

5. In a thermal distortion testing machine, a vertically disposed specimen supporting framework, bearing shafts attached to said framework, substantially frictionless bearings attached to said bearing shafts, a load shaft with vertically disposed guideways grooved therein, said bearings riding in said guideways and serving to support said load shaft in a vertical position, a heat controlled bath for partially receiving and supporting said specimen supporting framework, means to measure the temperature of the specimen, and means to measure the movement of said load shaft.

6. A thermal-distortion testing device comprising a specimen-supporting framework, means for variably distorting a specimen under test and mounted on said framework, means mounted on said framework and adapted for measuring specimen temperature and distortion, a tank for housing said framework, an outer tank housing the first-mentioned tank and being adapted to contain a thermal conducting fluid and a controlled heating stand for supporting and conducting heat to the outer wall of said outer tank.

DANOS H. KALLAS.
SAUL A. ELLER.
ERNEST DI LIBERTI.

REFERENCES CITED

The following references are of record in the file of this patent:

UNITED STATES PATENTS

| Number | Name | Date |
|---|---|---|
| 989,471 | Abraham | Apr. 11, 1911 |
| 1,184,837 | Edgecomb | May 30, 1916 |
| 1,826,732 | Chatillon | Oct. 13, 1931 |
| 1,952,523 | Abbott | Mar. 27, 1934 |
| 2,066,016 | Rossi et al. | Dec. 29, 1936 |